Patented Mar. 15, 1938

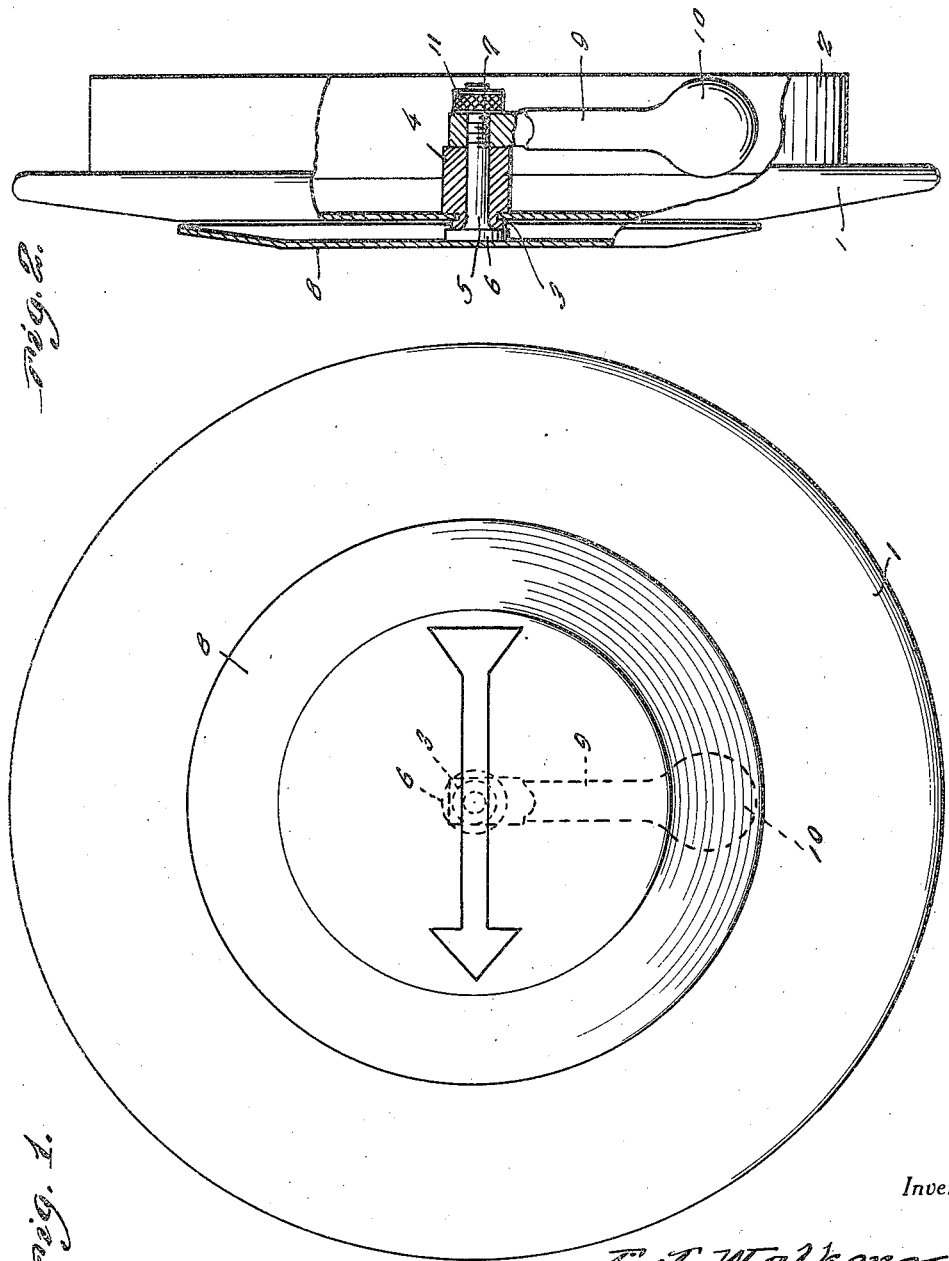

2,111,015

UNITED STATES PATENT OFFICE 2,111,015

DISPLAY DEVICE

Edward John Walker, Bridgeport, Conn.

Application October 27, 1937, Serial No. 171,350

1 Claim. (Cl. 40—129)

The present invention relates to new and useful improvements in display devices and has for its primary object to provide in a manner as hereinafter set forth, a display device involving relatively rotatable parts and has particular relation to automobile hub caps.

Another object of the invention is to provide a display device wherein a display part of the device is maintained from rotating with a rotating part with which it is associated with a view toward the maintenance of the display part in a desired position irrespective of rotation of the rotating part.

All of the foregoing and still further objects and advantages of the invention will become apparent from a study of the following specification, taken in connection with the accompanying drawing wherein like characters of reference designate corresponding parts throughout the several views, and wherein:

Figure 1 is a front view of my invention.

Figure 2 is a side view of my invention partly broken away and in vertical section.

Referring now to the drawing in detail, it will be seen that the embodiment of the invention which has been illustrated comprises a substantially saucer-shaped body member 1 having its peripheral edge turned and bent upon itself to form a laterally extending neck 2 for insertion in the usual hub cap opening in a vehicle wheel. In the center of the saucer-shaped body 1 there is an opening 3 in which there is secured by riveting or otherwise a bearing 4. A shaft 5 is mounted in the bearing 4, and has a head 6 formed on one end, and screw threads 7 cut on the opposite end.

A substantially saucer-shaped display carrying member 8 is secured by welding or otherwise to the head 6 of the shaft 5 in spaced relation to the body member 1.

An arm 9 is threaded onto the threads 7 of the shaft 5, and has integral therewith a weight 10. The lock nut 11 is then threaded on the threaded end 7 of the shaft 5 to securely lock and hold the arm 9 in fixed position.

The operation of the device is thought to be manifest, but may be briefly described as follows:

When the neck 2 of the body member 1 is placed in the usual hub cap receiving opening in a conventional vehicle wheel, the body member 1 is held by and turned with the wheel. The display carrying member 8, shaft 5 and weight 10 remain stationary with respect to the body member 1 due to the suspension of the weight 10 from the arm 9. This action allows any display matter to be easily read when the vehicle is in motion.

Although I have shown and described herein a preferred embodiment of my invention, it is to be definitely understood that I do not desire to limit the application of the invention thereto and any change or changes may be made in the materials and in the structure and arrangement of the parts, within the spirit of the invention as claimed.

What is claimed is:—

In a device of the character described, a hub cap, a bearing mounted centrally in the face of said hub cap and extending therethrough, a shaft journalled in said bearing and extending therethrough, a head on the outer end of said shaft engaged with the corresponding end of the bearing, a display carrying member adjacent said hub cap face and fixed on said head, a weighted arm threadedly mounted on the inner end portion of the shaft, and a lock nut threaded on said inner end portion of the shaft for securing the weighted arm in fixed position thereon.

EDWARD JOHN WALKER.